(12) United States Patent  (10) Patent No.: US 8,151,025 B1
Bouhraoua  (45) Date of Patent: Apr. 3, 2012

(54) FAST ROUND ROBIN CIRCUIT

(75) Inventor: Abdelhafid Bouhraoua, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 12/962,426

(22) Filed: Dec. 7, 2010

(51) Int. Cl.
*G06F 13/00* (2006.01)

(52) U.S. Cl. .......................................... 710/111; 326/46

(58) Field of Classification Search .................. None
See application file for complete search history.

(56) References Cited

U.S. PATENT DOCUMENTS

| | | | |
|---|---|---|---|
| 5,274,785 A * | 12/1993 | Kuddes et al. | 710/111 |
| 5,615,382 A * | 3/1997 | Gavin et al. | 710/53 |
| 5,870,560 A * | 2/1999 | Zulian | 709/225 |
| 6,675,245 B1 | 1/2004 | Schmidt | |
| 6,735,677 B1 * | 5/2004 | Stewart | 711/158 |
| 6,977,656 B1 * | 12/2005 | Lee | 345/535 |
| 7,099,972 B2 | 8/2006 | Chao | |
| 2004/0103231 A1 | 5/2004 | Zhu | |

* cited by examiner

*Primary Examiner* — Shawki S Ismail
*Assistant Examiner* — Crystal L Hammond
(74) *Attorney, Agent, or Firm* — Richard C. Litman

(57) ABSTRACT

The fast round robin circuit includes AND gates, OR gates, multiplexers and four D flip-flop gates configured to handle requests using linear propagation of a single grant token. In this manner the device avoids wasting clock cycles when some of the arbitrated entities do not have a pending request. The circuit has an R stage and an S stage. The R stage contains the request signal and an R memorization element to memorize the request. The S stage is the arbitration stage where the next active request is selected based on the position of the current request. The selection is then memorized in an S selection bit memorization element. There is one request signal and one pair of R and S Flip-Flops associated to every requesting entity. The selection circuit skips inactive requests to enable the next active request in a polling direction defined by the circuit.

4 Claims, 1 Drawing Sheet

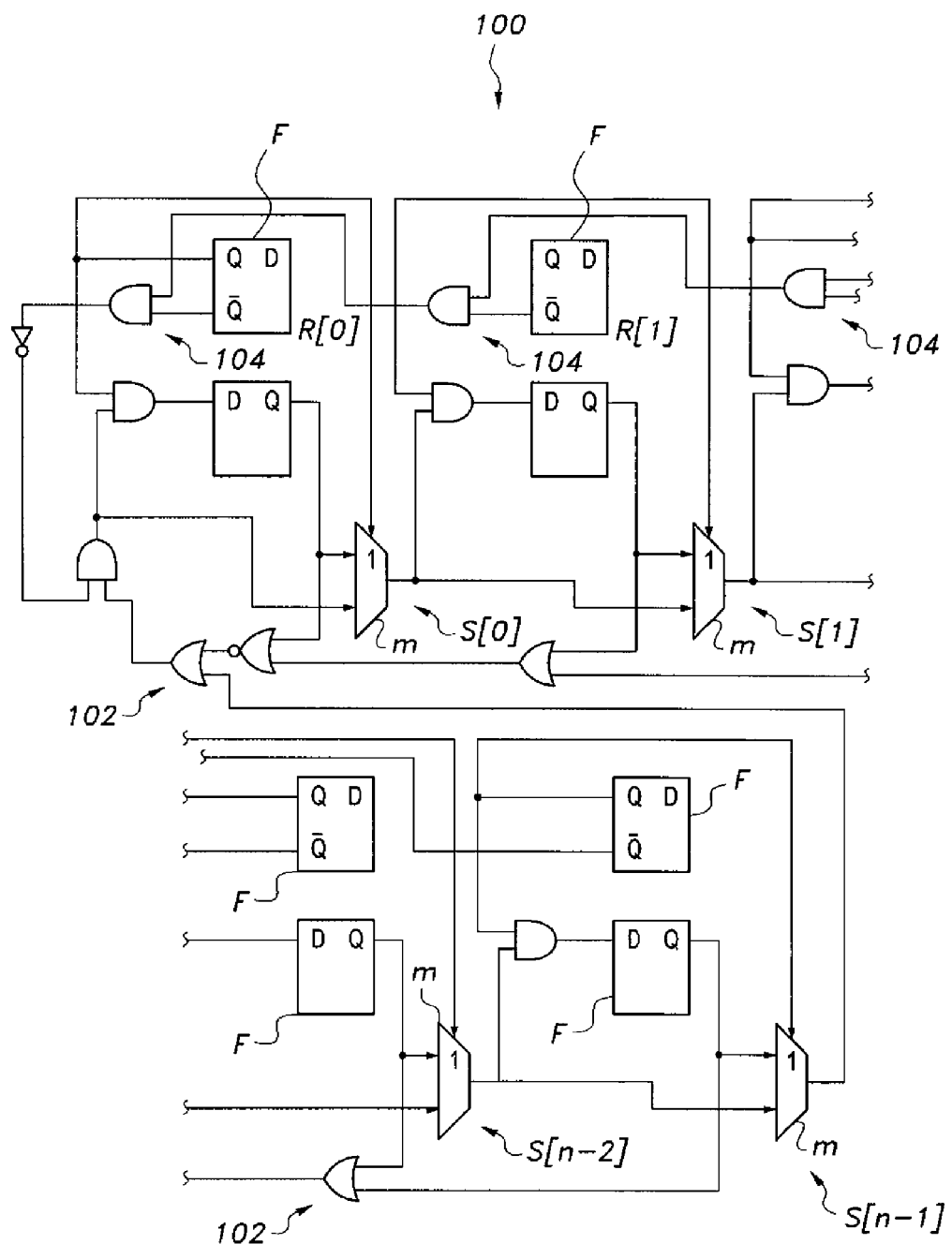

FAST ROUND ROBIN CIRCUIT

BACKGROUND OF THE INVENTION

1. Field of the Invention

The present invention relates to digital circuitry, and more particularly to a fast round robin circuit in the form of an electronic digital circuit that provides resource arbitration via a round robin priority scheme.

2. Description of the Related Art

The design of digital hardware generally follows the bottom-up paradigm. Desired behavior is translated into digital circuits that are assembled together to form the whole solution for a particular application. Several circuit categories exist in the field. Some are very common, such as memory blocks, counters, decoders, multiplexers, registers, and shift registers, all of which realize a single, contained function. Other circuits implement more complex functions. State of the art methodology often dictates the design of sequential circuits to realize complex functions. One such complex function is the arbitration of hardware resources, i.e. arbitration between several request-issuing entities seeking the right to use one shared hardware entity for a specific period of time. Although several round robin circuits are known, none has proven entirely satisfactory.

Thus, a fast round robin circuit solving the aforementioned problems is desired.

SUMMARY OF THE INVENTION

The fast round robin circuit includes a plurality of AND gates, OR gates, multiplexers and four D flip-flop gates configured to handle requests using linear propagation of a single grant token. In this manner, the device avoids wasting clock cycles when some of the arbitrated entities do not have a pending request.

These and other features of the present invention will become readily apparent upon further review of the following specification and drawings.

BRIEF DESCRIPTION OF THE DRAWINGS

The sole drawing FIGURE is a block diagram of an exemplary fast round robin circuit according to the present invention.

Similar reference characters denote corresponding features consistently throughout the attached drawings.

DETAILED DESCRIPTION OF THE PREFERRED EMBODIMENTS

Round robin arbitration is a very complex function that needs to be implemented in hardware to achieve optimal performance. Functionally speaking, several hardware entities seek the use of a target resource and compete to acquire the right to use it. This shared resource (a memory, a bus or any other hardware block that is shared) can only be allocated to one of the possible requesters at a time. The circuit that allocates the resource to one of the requesters should implement a certain method or algorithm to ensure fairness and avoid starvation. Fairness is the fair treatment of the requests coming from all requesting entities. Starvation is a side effect of a poorly implemented fair algorithm that results in never servicing some of the requesters. Fairness can be altered by some prioritization policies that will give more priority to some requesting entities over others. However, starvation should be absolutely avoided in all cases to ensure continuity of service to all possible requesting entities.

As shown in the FIGURE, the fast round robin circuit 100 includes an OR gate chain 102, an AND gate chain 104, multiplexers m and D flip-flop gates F configured to handle requests using linear propagation of a single grant token. In this manner, the device avoids wasting clock cycles when some of the arbitrated entities do not have a pending request. The fast round robin circuit 100 is able to allocate the target resource to one of the requesting entities every clock cycle. The circuit 100 has an R stage and an S stage. The R stage contains the request signal and a memorization element to memorize the request. Let this memorization element be called R. The S stage is the arbitration stage where the next active request is selected based on the position of the current request. The selection is then memorized in a second memorization element, the selection bit or S. There is one request signal and one pair of R and S Flip-Flops associated to every requesting entity. If there are n entities, there will be n pairs denoted R[0] to R[n−1] and S[0] to S[n−1].

The strength of the fast round robin circuit 100 comes from the fact that the selection circuit literally "skips" the inactive requests to enable the next active request in the direction of the polling (left-to-right in the exemplary case shown in the FIGURE). The round robin circuitry 100 realizes a de facto round robin prioritization. Thus, the device avoids wasting clock cycles when some entities do not have a pending request.

At any clock cycle, the resource is either allocated to one of the entities or is free. This translates to having at most one of the S bits at logic "1". Let's assume that the shared resource is currently allocated to entity i meaning that S[i]=1. The next clock cycle, the output of the multiplexer is also 1. For every entity j circularly located to the right of i, so that j∈[i+1, i−1] Modulo n, the following can happen.

If R[j]=0, the output of S[i] (equal to 1) is propagated to the next entity.

The first encountered entity j that is active (R[j]=1) gets the resource in the next cycle. This is because the input of S[j] is the output of the AND gate between the propagated output of S[i] and R[j].

A multiplexer m, controlled by R[j], determines whether the activation signal is either propagated or generated. When R[j]=0, the activation signal is propagated as the multiplexer m propagates the input coming from the previous entity. However, when R[j]=1, the activation signal is generated (through the multiplexer) and is set to S[j], which is currently equal to 0, forcing all the entities circularly located to the right of entity j to stay in a waiting state.

The OR gate chain 102 is used to generate an activation signal, even if the resource is free and all S bits are equal to 0. However, this generation may cause some instability in the circuit because of the combinational loopback introduced. This is not a problem when at least one of the R bits is equal to 1 because it breaks the cycle by regenerating the activation signal. However, it is a real issue when no request is present. To prevent instability from occurring, the cycle is alternately broken by the output of the AND gate chain 104 between all the R bits' inverts ($\overline{Q}$ in the Flip Flop) that qualifies the output of the OR chain 102 before looping it back into the activation signal.

t is to be understood that the present invention is not limited to the embodiment described above, but encompasses any and all embodiments within the scope of the following claims.

I claim:

1. A fast round robin circuit, comprising:
a sequential circuit including at least one stage of request flip-flops configured to contain a request signal R and to memorize the request signal;
a sequential circuit including at least one stage of select flip-flops configured to output a select signal S and to memorize the select signal, the request and the select flip flops being paired and associated to every requesting entity of a plurality of requesting entities;
at least one multiplexer accepting the select signal, the multiplexer selecting a highest sequential priority requesting entity among the plurality of requesting entities for data communication of the highest sequential priority requesting entity with a resource being requested by the highest sequential requesting entity among competing requests from among the plurality of requesting entities, wherein the requests are handled in a round robin manner while skipping inactive requests to handle subsequent active requests in a polling direction of the sequential circuit; and
an OR gate chain configured to generate an activation signal for polling said plurality of requesting entities even if said resource is free and no select signal is present, wherein said OR gate chain comprises a plurality of OR gates, an output of one of said OR gates comprising an input of a subsequent one of said OR gates in said OR gate chain.

2. The fast round robin circuit according to claim 1, further comprising an AND gate chain configured to alternately break a potentially unstable loopback cycle in said sequential circuit when no request is present.

3. A fast round robin circuit, comprising:
a sequential circuit including at least one stage of request flip-flops configured to contain a request signal R and to memorize the request signal;
a sequential circuit including at least one stage of select flip-flops configured to output a select signal S and to memorize the select signal, the request and the select flip flops being paired and associated to every requesting entity of a plurality of requesting entities;
at least one multiplexer accepting the select signal, the multiplexer selecting a highest sequential priority requesting entity among the plurality of requesting entities for data communication of the highest sequential priority requesting entity with a resource being requested by the highest sequential requesting entity among competing requests from among the plurality of requesting entities, wherein the requests are handled in a round robin manner while skipping inactive requests to handle subsequent active requests in a polling direction of the sequential circuit; and
an AND gate chain configured to alternately break a potentially unstable loopback cycle in said sequential circuit when no request is present, wherein said AND gate chain comprises a plurality of AND gates, an output of one of said AND gates comprising an input of a subsequent one of said AND gates in said AND gate chain.

4. The fast round robin circuit according to claim 3, further comprising an OR gate chain configured to generate an activation signal for polling said plurality of requesting entities even if said resource is free and no select signal is present.

* * * * *